United States Patent [19]

Trebot

[11] Patent Number: 5,139,410
[45] Date of Patent: Aug. 18, 1992

[54] PARISON STICK FOR INJECTION-BLOW MOULDING OF A HOLLOW BODY AND MACHINE USING SUCH A PARISON STICK

[75] Inventor: Alain Trebot, Bacqueville en Caux, France

[73] Assignee: Kerplass.N.C., Dieppe, France

[21] Appl. No.: 637,796

[22] Filed: Jan. 7, 1991

[30] Foreign Application Priority Data

Jan. 9, 1990 [FR] France .................. 90 00184

[51] Int. Cl.⁵ .............................................. B29C 49/58
[52] U.S. Cl. .................................... 425/530; 425/535
[58] Field of Search .......................... 425/529, 530, 535

[56] References Cited

U.S. PATENT DOCUMENTS

| | | | |
|---|---|---|---|
| 3,583,036 | 6/1971 | Brown | 425/185 |
| 3,791,098 | 2/1974 | Webster | 425/529 X |
| 3,969,060 | 7/1976 | Rosenkranz et al. | 425/525 |
| 4,150,689 | 4/1979 | Britten | 137/595 |
| 4,244,913 | 1/1981 | Ryder | 264/348 |
| 4,403,940 | 9/1983 | Krishnamumar et al. | 425/535 X |

FOREIGN PATENT DOCUMENTS 89219 5/1967 France .
2263876 10/1975 France .
63-154328 6/1988 Japan .

*Primary Examiner*—Richard L. Chiesa
*Attorney, Agent, or Firm*—Sherman and Shalloway

[57] ABSTRACT

A parison stick is used with an injection-blow molding machine for injection-blow molding of a hollow article of plastic material from a parison of this plastic material. The stick has three axially-contiguous portions. The portion (A) connects the parison stick to the injection-blow molding machine. The portion (B) positions the parison stick in the wall of a mold within the machine. The portion (C) terminates in the cavity of the mold and includes distinctly and axially-spaced first and second openings through which gas blows and inflates a parison previously injected around this portion. The openings are connected to a gas-feed chamber via at least one channel. The parison stick further includes at least one obturator connected to an actuator which is controlled by a control member of the machine.

8 Claims, 2 Drawing Sheets

PARISON STICK FOR INJECTION-BLOW MOULDING OF A HOLLOW BODY AND MACHINE USING SUCH A PARISON STICK

BACKGROUND OF THE INVENTION

The invention relates to a parison stick for an injection-blow moulding machine of a hollow body in plastic material, in particular a bottle of large size or having a double body, that is to say having two cavities connected via a bottle neck.

Hitherto, when produced by extrusion blow moulding, such bottles have defects of form, poor concentricity of the bottle neck and of the pouring neck, and variable wall thickness.

This results in considerable waste and a high manufacturing cost.

In order to remedy the inherent drawbacks of extrusion-blow moulding, some double-body bottles are produced by injection-blow moulding. When implementing such a process, it is necessary firstly to mould the first body, then to mould the second body and thereafter to assemble the two bodies. Injection-blow moulding thus requires two sets of equipment, which leads to a relatively high manufacturing cost.

Moreover, since the container is produced in three stages, this involves handling costs which increase the cost price.

In order to remedy this drawback, the invention aims to provide a parison stick which permits the injection-blow moulding of a double-body bottle in a single operation.

To this end, the invention relates to a parison stick for injection-blow moulding of a hollow article in plastic material, having a hollow cylindrical body comprising a portion for connection to an injection-blow moulding machine and extended axially by a portion for positioning in the wall of an associated mould of the machine, itself extended axially by a blow-moulding portion intended to be received in the cavity of the mould, and comprising first means for intermittent blow moulding, via a first blow-moulding opening, of a parison previously injected around the blow-moulding portion, these first means being arranged in the body of the parison stick, characterised in that the parison stick comprises, arranged in the body, second means for intermittent blow moulding, via a second blow-moulding opening, the first and second openings being distinct and spaced axially with respect to one another.

According to other features:

the blow-moulding means each comprise a channel connecting the associated opening to a common air-feed chamber and an obturator of the said opening connected to actuating means controlled by a control member of the machine;

the actuating means are controlled so as to simultaneously actuate the two obturators;

the air-feed chamber is located in the connection portion and is open on the radial free-end face of the latter in order to communicate, when positioned on the machine, with an air intake of the machine, the end of the chamber opposite the opening consisting of a wall pierced with an opening communicating with an axial bore passing through the body of the parison stick, and the actuating means are arranged in the chamber;

each obturator is of the type comprising a valve whose stem is connected to the actuating means and whose head interacts with a seat delimiting the associated opening, each valve being elastically returned against its seat in the closed rest position;

the actuating means comprise a thrust member mounted slidably in the chamber in order to be controlled by the control member of the machine, the thrust member having a radial thrust face located at that end of the latter which is distant from the opening, the stem of the valve of the first blow-moulding means consisting of a rod fixed to the thrust member and extending coaxially with the parison stick as far as the end of the latter delimiting the first opening, and comprise a guide member fixed in the chamber beyond the thrust member starting from the opening and pierced with an axial bore intended to have the rod pass through it and with longitudinal bores parallel to the axis of the parison stick, a bar being mounted slidably in each longitudinal bore and possessing an end bearing against the thrust face of the thrust member and an opposite end bearing against a radial end face of the valve stem of the second blow-moulding means;

the valve stem of the first blow-moulding means is arranged in a coaxial tube fixed on the guide member, the play between the valve stem and the inner wall of the tube forming the said channel of the first means, the tube having an end face delimiting the first opening located outside the body of the parison stick, and the valve of the second blow-moulding means consists of a sleeve mounted slidably between the tube and the inner wall of the body of the parison stick, the sleeve having an end located in the chamber between the base and the guide member in order to interact with the bars, and an opposite end which is widened in order to form a valve head intended to interact with the end face of the body of the parison stick which forms a valve seat, the channel of the second blow-moulding means being delimited between the outer wall of the sleeve and the inner wall of the body;

a ring is arranged at the end of the sleeve located in the chamber and comprises a collar, the valve of the second blow-moulding means being returned elastically by a helical spring arranged between the base of the chamber and the collar, the valve of the first blow-moulding means being returned elastically by a helical spring arranged between a shoulder of the guide member and the thrust member.

The invention also relates to an injection blow-moulding machine equipped with a mould intended to produce a bottle having a volume and a lower volume in mutual communication via a neck of small diameter, the blow moulding being carried out with the aid of a parison stick as described above and the moulding cavity of the mould comprising two volumes defining the shape of the bottle, the first blow-moulding opening of the parison stick being located in one of the volumes and the second opening in the other of the said volumes.

BRIEF DESCRIPTION OF THE DRAWINGS

The invention will be better understood on reading the following description given with reference to the appended drawings, in which.

DETAILED DESCRIPTION OF THE PREFERRED EMBODIMENT

Figure 1:
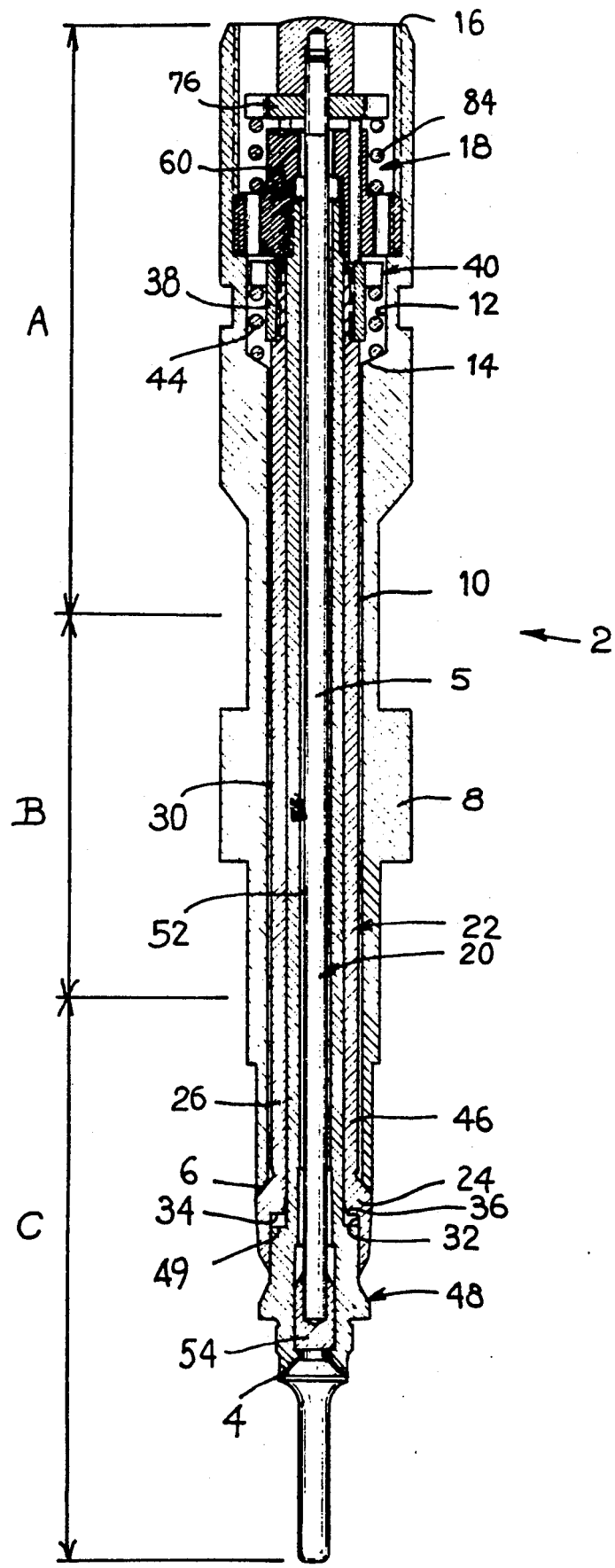
FIG. 1 is an axial section of a parison stick according to the invention in the rest position.
Figure 2:
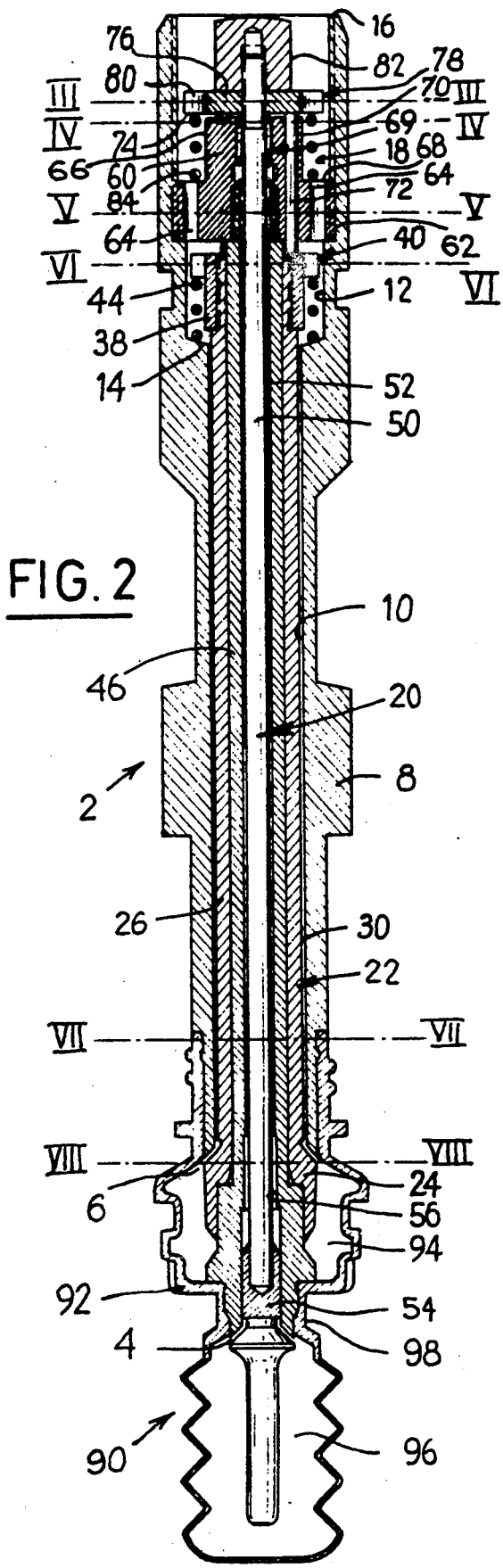
FIG. 2 is a sectional view, similar to FIG. 1, the parison stick being in the blow-moulding position and showing the bottle surrounding the parison stick after blow moulding.

FIGS. 1 and 2 show a parison stick 2 according to the invention, which has a general cylindrical form.

Conventionally, the parison stick 2 comprises a first portion A for connection to an injection-blow moulding machine which is not shown.

The portion A is extended axially by a portion B for positioning in the wall of an associated mould (not shown), the portion B itself being extended by a blow-moulding portion C. The portion C is intended to be located in the moulding cavity of the associated mould.

The portion C is intended to receive a parison at the injection station of an injection-moulding machine and is then positioned inside a blow-moulding mould in order to produce the desired hollow article by blow moulding.

To this end, the parison stick according to the invention comprises, in its portion C, two blow-moulding openings 4 and 6 which are spaced axially and two intermittent blow-moulding means each associated with one opening in order to cause the intermittent opening thereof.

In the embodiment shown, the parison stick 2 comprises a hollow cylindrical body 8 comprising an axial bore 10 opening in the portion A in a cylindrical chamber 12 with a diameter greater than that of the bore, thus delimiting a shoulder 14 forming the base of the chamber 12.

The chamber 12 is open on the free radial end 16 of the portion A.

When the parison stick is mounted on an injection-blow moulding machine, the chamber 12 communicates, via its opening, with a pressurised-air intake of the machine.

The intermittent blow-moulding means comprise actuating means 18 located in the chamber 12 which are intended to simultaneously open or close two movable obturators 20 and 22 associated with the openings 4 and 6, respectively.

The obturators 20 and 22 consist of valves.

The valve 22 comprises a head 24 intended to come to bear on the end face of the body 8 which forms a valve seat.

The valve stem consists of a sleeve 26 mounted slidably in the bore 10 of the body 8 and extending axially as far as the chamber 12, in the vicinity of the base 14.

Figure 7:
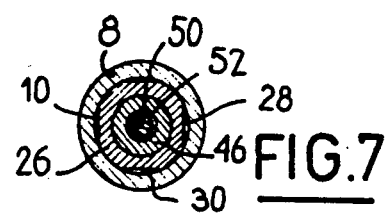

The outer surface of the sleeve 26 comprises four flat surfaces 28 (see FIG. 7) which, together with the bore 10, delimit four longitudinal channels or passages parallel to the axis 30 of the parison stick connecting the opening 6 to the chamber 12.

It should be noted that, as an alternative to the embodiment shown, it is possible to envisage there being only a single longitudinal channel or a different number of channels.

The head 24 of the valve 22 consists of a widened portion of the sleeve 26 projecting outside the body 8 of the parison stick 2.

The end of the head 24 comprises an axial bore 32 with a diameter which is greater than that of the internal diameter of the sleeve 26, thus defining a shoulder 34 (see FIG. 1).

An axial hole 36 of hexagonal section (see FIG. 8), which surrounds a radial section of the inner wall of the sleeve 26, extends upwards from the shoulder 34 in the case of FIG. 1 and over a reduced length. The hole 36 is intended to permit mounting of the valve 22, as will be described hereinafter.

The end of the sleeve 26 located in the chamber 12 is connected by screwing to a ring 38 which is mounted slidably in the lower portion of the chamber 12.

Figure 6:
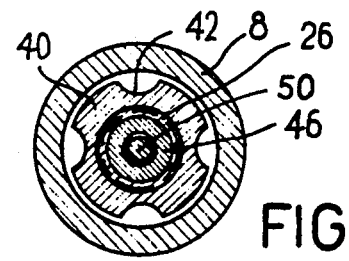

The ring 38 comprises a cylindrical portion screwed on the sleeve 26 and a radial collar 40 at its upper end. The collar comprises four grooves 42 hollowed out in its outer surface (see FIG. 6) in order to delimit air passages along the cylindrical wall of the chamber 12.

A spring 44 is located between the base 14 of the chamber 12 and the lower radial face of the collar 40 and stresses the assembly formed by the ring 38 and by the sleeve 26 in the axial direction corresponding to the closing of the opening 6 by the head 24 (upwards in the case of FIGS. 1 or 2).

A tube 46 which is fixed relative to the body 8 is arranged in the sleeve 26 so that the latter can slide over the outer surface of the tube 46.

The tube 46 comprises an enlarged lower end 48 received in the inner bore 32 of the sleeve 26 and projecting beyond the end of the latter, its radial end face defining the opening 4.

The end portion 48 comprises a shoulder 49 (see FIG. 1) forming a longitudinal stop for the shoulder 34 of the head 24 of the valve 22 when the latter is moved towards its open position (see FIG. 2).

The end portion 48 comprises an axially inclined end face forming a seat for the valve 20 whose stem 50 is mounted slidably with radial play inside the tube 46. The radial play delimits a longitudinal air-intake channel 52 parallel to the axis of the parison stick (see, also FIGS. 4 to 8), connecting the opening 4 to the chamber 12.

The internal diameter of the inner bore of the end 48 is greater than the internal diameter of the tube 46 in order to receive a slide 54 fixed to the end of the stem 50 and comprising, for example, longitudinal grooves (not shown) on its outer face in order to place the channel 52 and the opening 4 in communication.

Figure 8:
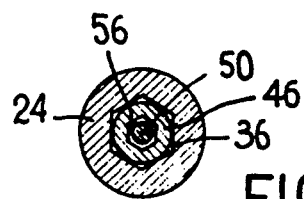

The portion receiving the slide 54 is extended by an axial hole 56 of hexagonal section having a relatively small length and intended to permit mounting of the tube 46, as will be described subsequently (see FIGS. 2 and 8).

The end of the tube 46 located in the chamber 12 projects outside the sleeve 26 in order to interact with the actuating means 18.

To this end, the end of the tube 46 comprises a portion which is threaded on the outside and interacts with a complementary thread of a guide member 60 which is itself screwed in the chamber 12 so that its lower radial end face is spaced from the collar 40 in the axial direction.

The member 60 has a two-stage cylindrical form. The stage 62 of greater section is screwed in the chamber 12 and comprises eight longitudinal through holes 64 (see, also, FIG. 5) forming passages for air towards the lower portion of the chamber 12 which contains the member 38.

The holes 64 are uniformly distributed over a circle which is coaxial with and of greater diameter than that of the section of the smaller stage 66 of the member 38.

The stage 66 extends the stage 62 upwards and defines therewith a radial bearing face 68.

The member 60 comprises an axial hole whose lower portion comprises the thread intended to interact with the threaded portion of the tube 46, as indicated hereinabove.

The thread is extended upwards by a bore 69 of hexagonal section whose smallest dimension is greater than the diameter of the section of the stem 50 of the valve 20 in order to receive the upper portion of the latter with radial play. The radial play forms the upper portion of the channel 52.

The member 60 is also pierced over its entire length with three apertures 70 (see FIG. 4) in which three bars 72 are slidably mounted.

The lower radial end of the bars 72 comes to bear on the upper radial face of the assembly formed by the ring 38 and the stem 26 of the valve 22.

The second end of the bars 72 comes to bear on a lower radial face 74 of a thrust member 76.

Figure 3:
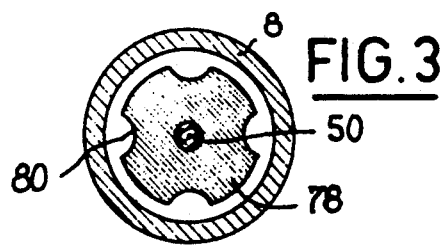
FIGS. 3 to 8 show radial sections of the parison stick according to the lines III—III to VIII—VIII in FIG. 2.

The thrust member 76 comprises, in its lower portion, a circular collar 78 mounted slidably in the chamber 12 and comprising four longitudinal grooves 80 (see FIG. 3) on its outer cylindrical surface. The grooves 80 form air passages in order to enable the air coming from the machine to circulate in the chamber 12.

Above the collar 78, the thrust member 76 comprises a portion 82 which interacts with a control member (not shown) of the machine, intended to cause the thrust member 76 to slide axially against a spring 84. The spring 84 is arranged between the face 68 of the member 60 and the face 74 of the thrust member 76.

The thrust member 76 comprises an axial thread ending on the face 74 in which the upper end of the stem 50 of the valve 20 is fixed by screwing.

In such an arrangement, the spring 84 stresses the assembly of the thrust member 76 and of the valve 20 upwards, that is to say it elastically returns the valve 20 towards its rest position or closed position.

In order to produce the parison stick, the valve 22 is firstly installed in the body of the parison stick.

To this end, the sleeve is inserted via the blow-moulding end of the hollow body whilst the spring 44 and the ring 38 are inserted in the chamber 12. The valve 22 is screwed on the ring 38 with the aid of a hexagonal wrench inserted in the axial hole 36 of hexagonal section, whilst the ring 38 is held by a wrench. With the screwing operation completed, the head of the valve 22 comes to bear on the end of the hollow body, this bearing phenomenon being due to the action of the spring 44.

Figure 4:
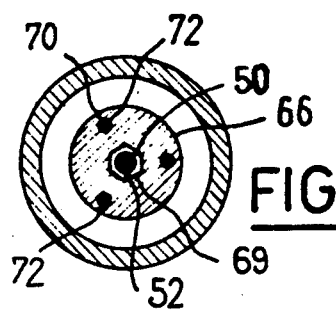
Figure 5:
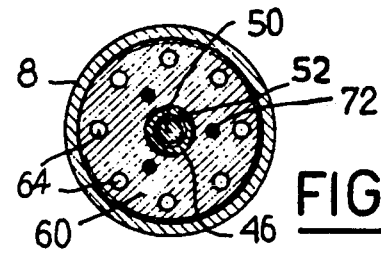

The guide member 60 is thereafter screwed in the chamber 12 with the aid of a wrench interacting with the hexagonal hole 67 (see FIG. 4). The bars 72 are then inserted in the bores 70 of the guide member.

The tube 46 is then inserted inside the sleeve and its upper end is screwed in the guide member 60 with the aid of a wrench interacting with the axial hole 56 of hexagonal section.

The rod forming the stem of the valve 20 is then inserted via the lower end of the tube 46 until the valve head comes to close the opening 4.

At this point, the spring 84 is inserted in the chamber around the stage of smaller section of the guide member 60. Then, the thrust member 76 comes to compress the spring 84 and is fixed by screwing on the end of the rod forming the stem 50 of the valve 20.

A parison stick according to the invention is thus obtained, comprising two means for intermittent blow moulding via two openings 4 and 6, respectively, which make it possible to produce a bottle having a double body, as shown diagrammatically in FIG. 2.

It should be noted that such a parison stick may be used for containers delimiting a single volume but which cannot be efficiently produced with the aid of a single blow-moulding orifice.

The parison stick thus assembled may be mounted on an injection-blow moulding machine.

At the blow-moulding station of the machine, a member slides the thrust member 76 against the spring 84.

Such a movement entrains the rod 50 screwed in the thrust member 76, which causes the displacement of the valve head which moves away from its seat in order to enable the pressurised air contained in the chamber 12 and the channel 50 to escape via the opening 4.

Moreover, sliding the thrust member 76 entrains the sliding of the bars 72 and of the sleeve 26 whose enlarged portion forming the valve head moves away, against the force of the spring 44, from its seat in order to enable air to be blown via the opening 6.

A bottle 90, for example, is thus obtained, having, for example, (see FIG. 2) a pouring neck 92 and whose wall delimits a upper volume 94 and a lower volume 96.

The upper and lower volumes are mutually connected via a bottle neck 98 which is coaxial with the neck 92.

In the embodiment described, there is simultaneous blow moulding via the two openings 4 and 6. In an alternative embodiment, it is possible for the blow-moulding operations to be spaced over time, delaying the action of the bars 72 on the sleeve 26, for example by reducing their length.

With blow moulding completed, the member of the machine releases the thrust member 76 and the springs 44 and 84 return the valves towards their rest position, that is to say their closed position.

I claim:

1. An injection-blow molding machine with a parison stick for injection-blow molding a hollow article of plastic material from a parison of said plastic material, said hollow article having an upper volume in fluid flow communication through a neck with a lower volume, said stick having a generally hollow and substantially cylindrical body having first, second and third axially-contiguous portions (A,B,C) wherein in operable mode, the first portion (A) connects the parison stick to said injection-blow molding machine, the second portion (B) positions the parison stick in the wall of a mold within said injection-blowing machine, and the third portion (C) terminates in the cavity of the mold, said cavity having upper and lower portions defining the upper and lower volumes of said hollow article, said parison stick comprising:

first and second openings, said openings being distinct and axially spaced in the third portion (C), the first opening communicating with the upper volume of said hollow article and the second opening communicating with the lower volume of said hollow article;

a gas-feed chamber;

first and second obturator means for intermittently opening and closing said first and second openings, respectively, thereby allowing gas to blow through said first and second openings to inflate, in operable mode, a parison previously injected around the third portion (C), each of the obturator means comprising at least one channel and at least one obturator operably associated with each of said first and second openings, whereby each of said first and second openings is connected to the gas-feed chamber via the respective at least one channel; and at least one actuating means for activating a respective one of said at least one obturator to intermittently open and close the respective one of said first and second openings, said actuating means, being controlled by at least one control member of the molding machine.

2. The injection-blow molding machine according to claim 1 in which the parison stick has at least two obturators and wherein, in operable mode, said obturators are simultaneously actuated by said actuating means.

3. The injection-blow molding machine according to claim 1 in which an axial bore passes through the body of said parison stick and said actuating means are arranged in the gas-feed chamber, said gas-feed chamber being located in the first portion (A) and having two ends, wherein one end is open on a radial free-end face of said first portion (A) for communicating, when positioned on the machine, with an air intake of the machine and the opposite end has an opening communicating with said axial bore passing through the body of the parison stick.

4. The injection-blow molding machine according to claim 3 in which each of said at least one obturator comprises a valve having a stem, and a head, and a seat, said stem being connected to an actuating means, said seat defining a surface of the operably associated opening, said head interacting with the seat, said valve being returned against its seat when in the closed rest position.

5. The injection-blow molding machine according to claim 4 in which said actuating means comprises a thrust member slidably mounted in said gas-feed chamber, said thrust member having a radial thrust face located at its lower surface;

the stem of the valve of the first obturator means comprising a rod; said rod being fixed to the thrust member and extending coaxially to the lower end of said parison stick to thereby define the first opening, a guide member fixed in said gas-feed chamber beyond the thrust member starting from the opening and having an axial bore and a plurality of longitudinal bores, said rod fitting within said axial bore, said longitudinal bores being parallel to the axis of the parison stick, and said longitudinal bores having a slidably mounted bar within each, each said bar comprising one end bearing against the thrust face and an opposite end bearing against a radial end face of a valve stem of the second obturator means.

6. The injection-blow molding machine according to claim 5 wherein;

said parison stick comprises an inner wall and an outer wall;

a coaxial tube fixed on the guide member and having the valve of the first obturator means arranged therein, wherein the valve stem of said valve of the first obturator means and the inner wall of said coaxial tube forms an annular channel;

said tube extending to the outer wall of the parison stick and terminating in a radial-end face defining the first opening;

the valve of the second obturator means comprising a sleeve and a valve seat; said valve seat being formed by the lower end face of the body of said parison stick, said sleeve being mounted slidably between the tube and the inner wall of the body of the parison stick, the sleeve having one end located in the chamber between the base and the guide member for interacting with the bars, and an opposite end being substantially widened and forming a valve head of the valve of the second obturator means; said valve head interacting with said valve seat;

the channel of the second obturator means being delimited between the outer wall of the sleeve and the inner wall of the body.

7. The injection-blow molding machine according to claim 6 further comprising a ring and a helical spring, said ring comprising a collar and being located at the end of the sleeve in the gas-feed chamber, said helical spring being positioned between a base of the chamber and the collar, said valve of the second obturator means being returned elastically by said helical spring; and wherein the valve of the first obturator means is returned elastically by a helical spring being positioned between a radial face of the guide member and the thrust member.

8. The injection-blow molding machine of claim 1 for making a bottle of plastic material from a parison of said plastic material, said bottle having an upper volume in fluid flow communicating through a neck of a small diameter with a lower volume, further comprising:

at least one means controlling the actuating means of the parison stick.

* * * * *